(12) United States Patent
Hofer

(10) Patent No.: US 8,070,555 B2
(45) Date of Patent: Dec. 6, 2011

(54) VISUAL FEEDBACK FOR AIRFOIL POLISHING

(75) Inventor: Douglas Carl Hofer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 644 days.

(21) Appl. No.: 12/263,515

(22) Filed: Nov. 3, 2008

(65) Prior Publication Data

US 2010/0112899 A1 May 6, 2010

(51) Int. Cl.
*B24B 49/00* (2006.01)
(52) U.S. Cl. ......... 451/5; 451/6; 451/9; 451/10; 451/11; 451/29; 451/54
(58) Field of Classification Search .............. 451/5, 6, 451/8, 9, 10, 11, 28, 29, 44, 54
See application file for complete search history.

(56) References Cited

U.S. PATENT DOCUMENTS

| | | | |
|---|---|---|---|
| 5,047,966 A | | 9/1991 | Crow et al. |
| 6,629,877 B2* | | 10/2003 | Cerniway ................. 451/43 |
| 7,774,086 B2* | | 8/2010 | David et al. ............... 700/160 |
| 2002/0057830 A1 | | 5/2002 | Akin et al. |
| 2002/0119731 A1* | | 8/2002 | Hofmann ..................... 451/5 |
| 2002/0119736 A1* | | 8/2002 | Cerniway ................. 451/43 |
| 2005/0159840 A1 | | 7/2005 | Lin et al. |

FOREIGN PATENT DOCUMENTS

EP 1537959 A2 6/2005

OTHER PUBLICATIONS

European Patent Office, European Search Report, Feb. 18, 2010 for Application EP 09174235.3-2302,5 pages.
NVision Products, NVision, Inc., Laser Scanning-Reverse Engineering-Inspection Services, retrieved on Oct. 30, 2008 from: http://www.nvision3d.com/products.html.

* cited by examiner

*Primary Examiner* — Eileen P. Morgan
(74) *Attorney, Agent, or Firm* — Hoffman Warnick LLC; Ernest G. Cusick

(57) ABSTRACT

A visual feedback system and method for airfoil polishing is disclosed. In one aspect there is a system for providing visual feedback during a polishing operation of a workpiece. In this system there is a model having a representation of a desired shape of the workpiece. A scanning system generates a representation of a current shape of the workpiece while in-process during the polishing operation. A comparator compares the current shape of the workpiece to the desired shape of the workpiece. An illumination system highlights the workpiece with visible light during the polishing operation. The highlighting of the workpiece with visible light is a function of the comparison between the current shape and the desired shape. The illumination system highlights a portion of the workpiece that needs additional polishing to conform to the desired shape.

17 Claims, 3 Drawing Sheets

US 8,070,555 B2

VISUAL FEEDBACK FOR AIRFOIL POLISHING

BACKGROUND OF THE INVENTION

The present invention relates generally to manufacturing turbine buckets and more particularly to providing continuous visual feedback while performing a polishing operation on an airfoil used for a turbine bucket or a turbine nozzle.

Typically, a polish operator skilled in polishing turbine airfoils will manually polish each airfoil by hand to remove machining marks from the surface of the airfoil to attain its final desired shape. Often the operator will remove too much material from the airfoil during the polish operation. In order to account for the removal of too much material during the polish operation, a machinist that machines the airfoil will add more material to the base shape of the airfoil to account for the excess amount of material typically removed during the polishing. This is helpful in obtaining an airfoil that will be closer to its final desired shape. Despite this effort to bring the airfoil to its final desired shape, this process often results in an airfoil having a blade profile with tolerances that are greater than may be desired. An airfoil with greater tolerances often leads to variation in performance and mechanical properties. In addition, the greater tolerances that result from this polishing process make it difficult to manufacture airfoils having more advanced shapes with higher performance entitlements.

BRIEF DESCRIPTION OF THE INVENTION

In one aspect of the present invention, a system for providing visual feedback during a polishing operation of a workpiece is provided. The system comprises a model having a representation of a desired shape of the workpiece. A scanning system generates a representation of a current shape of the workpiece while in-process during the polishing operation. A comparator compares the current shape of the workpiece to the desired shape of the workpiece. An illumination system highlights the workpiece with visible light during the polishing operation. The highlighting of the workpiece with visible light is a function of the comparison between the current shape and the desired shape. The illumination system highlights a portion of the workpiece that needs additional polishing to conform to the desired shape.

In another aspect of the present invention, a system for providing visual feedback during a polishing operation of a turbine bucket is provided. The system comprises a model having a representation of a desired shape of the turbine bucket. A scanning system generates a representation of a current shape of the turbine bucket while in-process during the polishing operation. A comparator compares the current shape of the turbine bucket to the desired shape of the turbine bucket. An illumination system highlights the turbine bucket with visible light in real-time during the polishing operation. The illumination system highlighting the turbine bucket as a function of the comparison between the current shape and the desired shape. The illumination system highlights a portion of the turbine bucket that needs additional polishing to conform to the desired shape with the visible light.

In a third aspect of the present invention, there exists a method for providing visual feedback during a polishing operation of a workpiece. The method comprises: generating a representation of a current shape of the workpiece while in-process during the polishing operation; obtaining a representation of a desired shape of the workpiece; comparing the current shape of the workpiece to the desired shape of the workpiece; determining a portion of the workpiece that needs additional polishing in response to comparing the current shape of the workpiece to the desired shape of the workpiece; and highlighting the portion of the workpiece that needs additional polishing with visible light during the polishing operation.

DETAILED DESCRIPTION OF THE INVENTION

At least one embodiment of the present invention is described below in reference to its application in connection with providing visual feedback to an operator performing a polishing operation of a turbine airfoil that may be used in a bucket or nozzle. However, it should be apparent to those skilled in the art and guided by the teachings herein that the present invention is likewise applicable to any workpiece that undergoes a process operation and where it is desirable to receive visual feedback in real-time during the operation in order to ascertain how well the workpiece is conforming to its desired shape.

Figure 1:
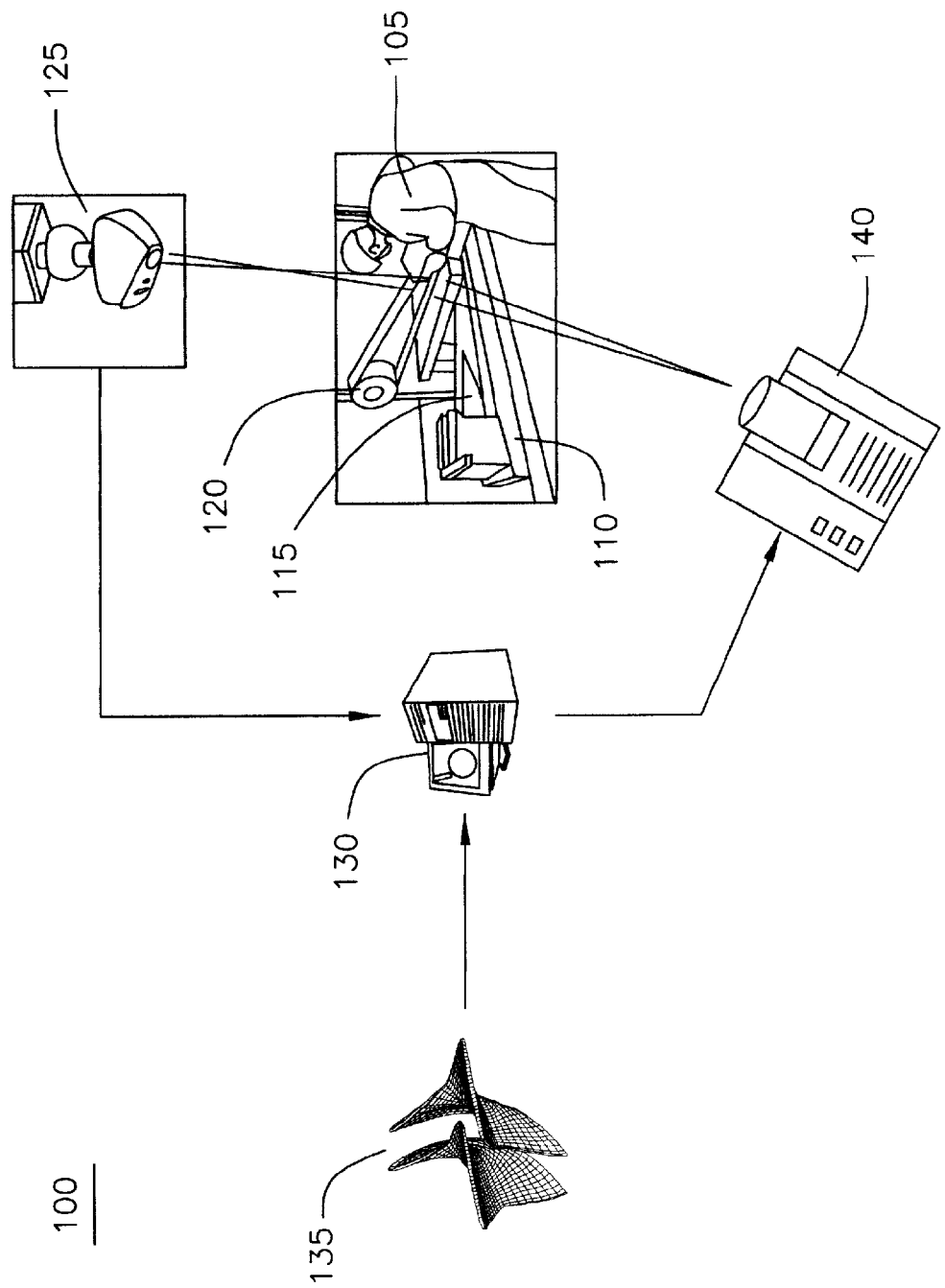
FIG. 1 is a schematic illustration of a system that provides visual feedback during a polishing operation of a turbine bucket according to one embodiment of the present invention.

Referring to the drawings, FIG. 1 is a schematic illustration of a system 100 that provides visual feedback during a polishing operation of a turbine bucket. In FIG. 1, there is a polish operator 105 using a polishing unit 110 to polish a turbine bucket 115 placed horizontally on polishing unit 110. Polishing unit 110 generally comprises a sandpaper strip 120 that polish operator 105 moves over the surface of bucket 115 to remove ridges from the surface that arose in the machining of bucket 115. During the polishing of bucket 115, a scanning system 125 generates a digital representation of the current shape of bucket 115 while in-process during the polishing operation. In particular, scanning system 125 uses well-known part-shape analysis methodologies to measure the current shape of bucket 115 and generate a three-dimensional surface map of bucket 115 in real-time, while it is in-process of being polished by polish operator 105.

A computing unit 130 receives a representation of the current shape of bucket 115 generated from scanning system 125 in real-time during the polish operation. Computing unit 130 also obtains a model 135 having a digital representation of the desired shape of bucket 115. In one embodiment, model 135 is a three-dimensional model of bucket 115 generated from a conventional computer-aided design (CAD) application that is utilized by computing unit 130. Computing unit 130 is programmed to compare the current shape of bucket 115 generated from scanning system 125 in real-time during the polish operation to the desired shape of bucket 115 as set forth in model 135. From this comparison, computing unit 130 assesses the thickness of bucket 115. In particular, computing unit 130 determines where bucket 115 is too thick in comparison to its desired shape. Regions that are too thick are an indication that these regions need more polishing to remove excess material.

Computing unit 130 identifies all regions of bucket 115 that are too thick (i.e., needs additional polishing) and directs an illumination system 140 to highlight these regions of bucket 115 with visible light during the polishing operation. Polish operator 105 uses the visible light as a guide indicating that these regions of bucket 115 need additional polishing. Like the generation of the current shape of bucket 115 from scanning system 125 and comparison with the current shape by computing unit 130, the illumination of bucket 115 with visible light occurs in real-time during the polish operation. The generation of the current shape of bucket 115, comparison with desired shape 135 and illumination of regions still requiring polishing continues until computing unit 130 determines that bucket 115 conforms to the desired shape. Those skilled in the art will recognize that conforming to the desired shape can also include being within a predetermined tolerance level.

In one embodiment, scanning system 125 comprises an optical scanning system such as an optical coordinate measuring machine (optical CMM). Optical CMMs are well-known and commercially available. One example, of an optical CMM that can be used to implement the present invention is an NVision MAXOS scanner. Those skilled in the art will recognize that other scanning systems can be used in place of the optical CMM to analyze and assess the shape of bucket 115 during the polishing operation. For example, a CMM that uses a contact probe can be used to generate a representation of bucket 115.

Illumination system 140 can be any type of illumination system that can be controlled to direct visible light onto a workpiece such as bucket 115 to guide operation thereon. For ease of illustration, FIG. 1 portrays illumination system 140 as a liquid crystal display (LCD) projector, however, those skilled in the art will recognize that a multitude of possibilities exist. For example, in one embodiment, illumination system 140 can include a laser illumination system. Other possibilities may include a Digital Light Projecting (DLP) projector or a cathode ray tube (CRT).

Figure 2:
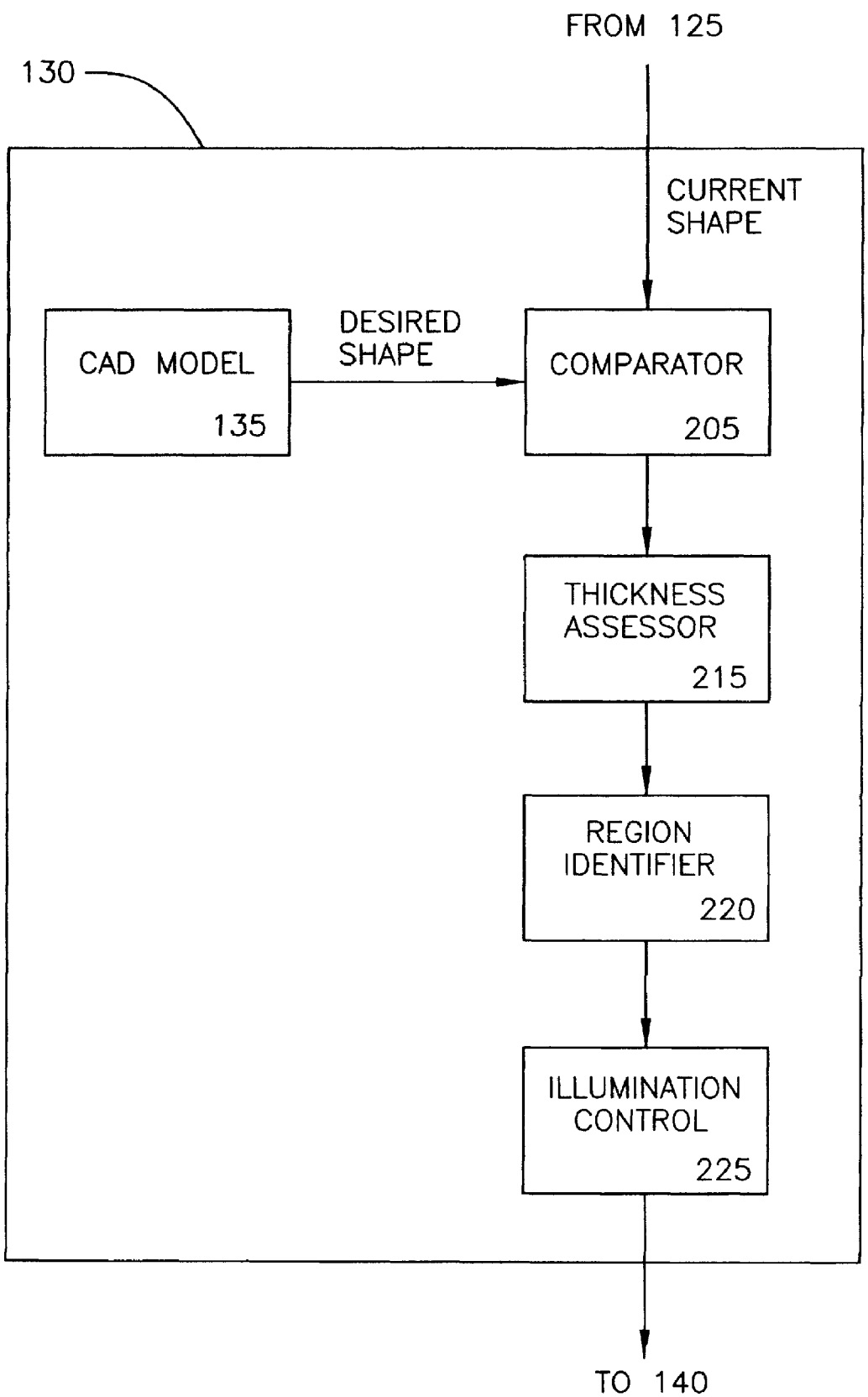
FIG. 2 is a schematic illustration showing some of the functionality components associated with the computing unit depicted in FIG. 1 according to one embodiment of the present invention.

FIG. 2 is a schematic illustration showing some of the functionality components associated with computing unit 130 depicted in FIG. 1 according to one embodiment of the present invention. FIG. 2 only shows the components of computing unit 130 that facilitate a general understanding of the approach used to receive a current representation of bucket 115 while in-process of undergoing a polishing operation, obtain a desired shape of bucket 115, compare the current shape to the desired shape, identify regions that need further polishing, and control illumination system 140 to provide visual feedback to polish operator 105. Those skilled in the art will recognize that computing unit 130 can have additional components not shown in FIG. 1. For example, the controller 104 may have a user interface component that enables an operator to input commands, data and/or to monitor the polish operation.

As shown in FIG. 2, computing unit 130 comprises a comparator 205 that receives a representation of the current shape of bucket 115 generated from scanning system 125 in real-time during the polish operation and a representation of the desired shape of bucket 115 from CAD model 135. Comparator 205 compares the current shape to the desired. A thickness assessor 215 assesses the thickness of bucket 115. Thickness assessor 215 assesses the thickness by noting regions of the blade that are not in tolerance. Region identifier 220 identifies all regions of bucket 115 that are too thick (i.e., needs additional polishing). Illumination control 225 directs illumination system 140 to highlight these regions of bucket 115 with visible light. In an embodiment where the illumination system 140 is a laser illumination system, illumination control 225 highlights regions with visible light by controlling mirrors to reflect laser light onto the appropriate regions of the airfoil. The comparison of the current shape with desired shape, thickness assessment, region identification and illumination of regions with visible light continues until computing unit 130 determines that bucket 115 conforms to the desired shape. Those skilled in the art will recognize that in one embodiment the functions associated with thickness assessor 215 and region identifier 220 can be performed directly by comparator 205 thus obviating the need for thickness assessor 215 and region identifier 220. In this embodiment, output from comparator 205 is fed directly to illumination control 225.

In various embodiments of the present invention, computing unit 130 can take the form of an entirely hardware embodiment, an entirely software embodiment or an embodiment containing both hardware and software elements. In a preferred embodiment, the processing functions performed by the computing unit 130 are implemented in software, which includes but is not limited to firmware, resident software, microcode, etc.

Furthermore, the processing functions performed by computing unit 130 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the computer, instruction execution system, apparatus, or device. The computer readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

Figure 3:
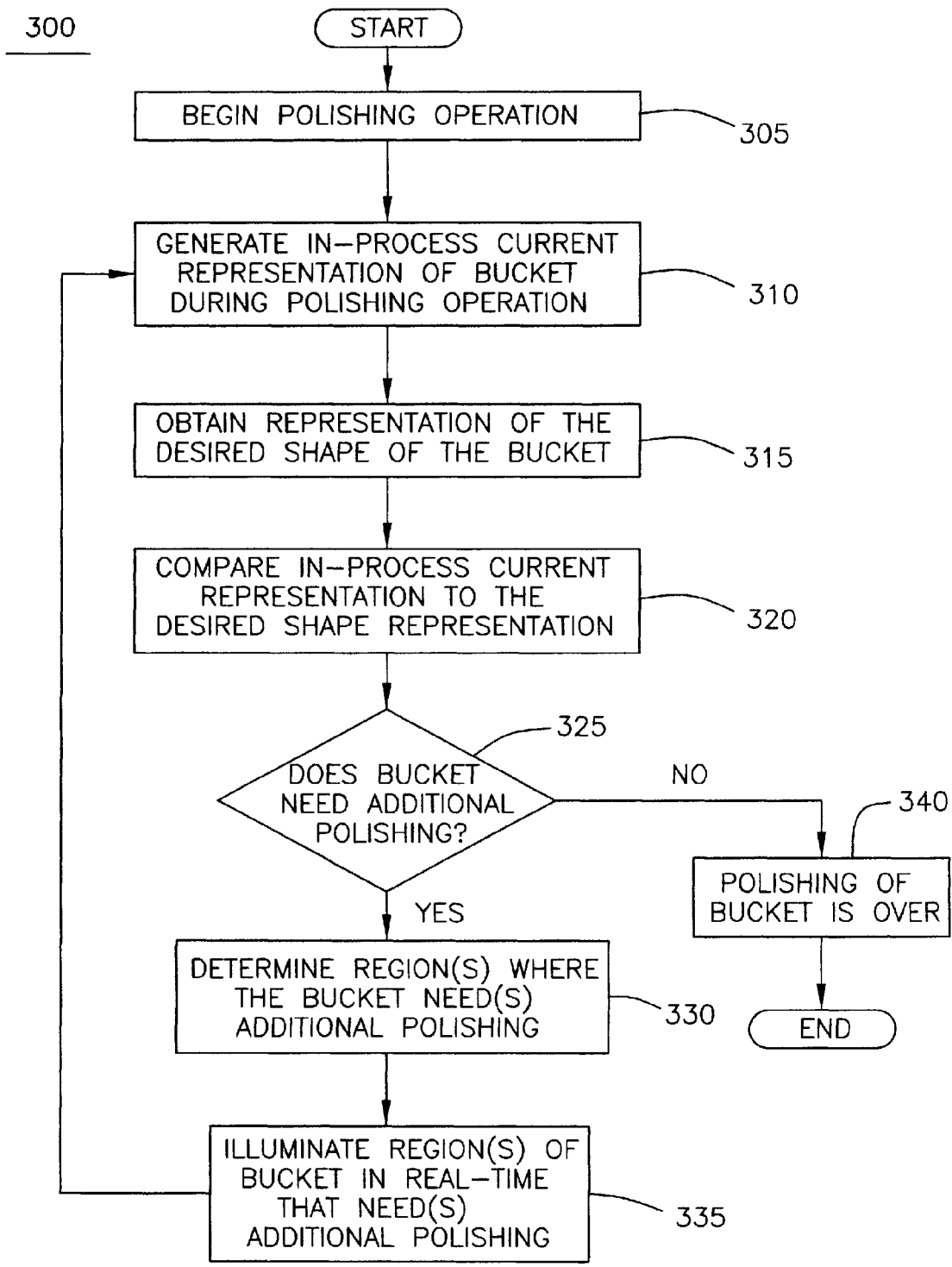
FIG. 3 is a flow chart describing the process operations associated with using the system depicted in FIG. 1.

FIG. 3 is a flow chart 300 describing the process operations associated with using the online system depicted in FIG. 1. As shown in FIG. 3, the polishing operation of bucket 115 begins at 305 to remove ridges at the surface that arose in the machining of the bucket. Scanning system 125 generates a representation of the current shape of bucket 115 in real-time while in-process during the polishing operation at 310. Computing unit 130 obtains a representation of the desired shape of bucket 115 at 315. Computing unit 130 compares the current shape of bucket 115 generated from scanning system 125 to the desired shape of bucket 115 at 320. If it is determined at 325 that bucket 115 needs additional polishing, then computing unit 130 identifies all regions of bucket 115 that are too thick (i.e., needs additional polishing) at 330. Computing unit 130 directs illumination system 140 to highlight these regions of bucket 115 with visible light during the polishing operation at 335. Polish operator 105 uses the visible light as a guide to follow while polishing bucket 115. In the mean time, process operations 310-335 continue until it is determined at process block 325 that bucket 115 does not need additional polishing. When that determination is made, then the polishing of bucket 115 is over as shown at process block 340.

The foregoing flow chart shows some of the processing functions associated with providing visual feedback in real-time to an operator performing polishing of a bucket. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A system for providing visual feedback during a polishing operation of a workpiece, comprising:
    a polishing unit that performs the polishing operation of the workpiece;
    a model having a three-dimensional digital representation of a desired shape of the workpiece;
    a scanning system that generates a three-dimensional surface map representation of a current shape of the workpiece while in-process during the polishing operation performed by the polishing unit;
    a comparator that compares the current shape of the workpiece from the three-dimensional surface map representation generated by the scanning system to the desired shape of the workpiece as embodied by the three-dimensional digital representation of the model; and
    an illumination system that highlights the workpiece with visible light during the polishing operation, the highlighting of the workpiece with visible light is a function of the comparison between the current shape of the workpiece from the three-dimensional surface map representation generated by the scanning system with the desired shape of the workpiece as embodied by the three-dimensional digital representation of the model, the illumination system highlighting a portion of the workpiece that needs additional polishing by the polishing unit to conform to the desired shape.

2. The system according to claim 1, wherein the scanning system comprises an optical coordinate measuring machine.

3. The system according to claim 1, wherein the illumination system is selected from the group consisting of a laser illumination system, an LCD projector, a DLP projector and a CRT.

4. The system according to claim 1, wherein the illumination system continues highlighting the workpiece during the polishing operation until a desired tolerance between the current shape of the workpiece and desired shape of the workpiece is attained.

5. The system according to claim 1, wherein the illumination system highlights the workpiece in real-time during the polishing operation.

6. The system according to claim 1, wherein the illumination system illuminates the portion of the workpiece that needs additional polishing with the visual light.

7. A system for providing visual feedback during a polishing operation of an airfoil, comprising:
    a polishing unit that performs the polishing operation of the airfoil;
    a model having a three-dimensional digital representation of a desired shape of the airfoil;
    a scanning system that generates a three-dimensional surface map representation of a current shape of the airfoil while in-process during the polishing operation performed by the polishing unit;
    a comparator that compares the current shape of the airfoil from the three-dimensional surface map representation generated by the scanning system to the desired shape of the airfoil as embodied by the three-dimensional digital representation of the model; and
    an illumination system that highlights the airfoil with visible light in real-time during the polishing operation, the illumination system highlights the airfoil as a function of the comparison between the current shape of the airfoil from the three-dimensional surface map representation generated by the scanning system with the desired shape of the airfoil as embodied by the three-dimensional digital representation of the model, the illumination system highlighting a portion of the airfoil that needs additional polishing by the polishing unit to conform to the desired shape with the visible light.

8. The system according to claim 7, wherein the scanning system comprises an optical coordinate measuring machine.

9. The system according to claim 7, wherein the illumination system is selected from the group consisting of a laser illumination system, an LCD projector, a DLP projector and a CRT.

10. The system according to claim 7, wherein the illumination system continues highlighting the airfoil during the polishing operation until a desired tolerance between the current shape of the airfoil from the three-dimensional surface map representation generated by the scanning system and the desired shape of the airfoil as embodied by the three-dimensional digital representation of the model is attained.

11. A method for providing visual feedback during a polishing operation of a workpiece, comprising:
    using a polishing unit to perform the polishing operation of the workpiece;
    generating a three-dimensional surface map representation of a current shape of the workpiece while in-process during the polishing operation;
    obtaining a three-dimensional digital representation of a desired shape of the workpiece;
    comparing the current shape of the workpiece from the three-dimensional surface map representation to the desired shape of the workpiece as embodied by the three-dimensional digital representation of the model;
    determining a portion of the workpiece that needs additional polishing in response to comparing the current shape of the workpiece from the three-dimensional surface map representation to the desired shape of the workpiece as embodied by the three-dimensional digital representation of the model;
    highlighting the portion of the workpiece that needs additional polishing with visible light during the polishing operation; and
    continuing the polishing of the workpiece in accordance with the highlighting of the workpiece until completion of the polishing operation.

12. The method according to claim 11, wherein the generating of the three-dimensional surface map representation of the current shape of the workpiece comprises measuring the shape of the workpiece during the polishing operation.

13. The method according to claim 11, wherein the obtaining of the representation of the desired shape of the workpiece as embodied by the three-dimensional digital representation of the model comprises retrieving a computer-aided design model of the workpiece.

14. The method according to claim 11, wherein the highlighting of the portion of the workpiece with visible light occurs in real-time during the polishing operation.

15. The method according to claim 11, wherein the highlighting of the portion of the workpiece with visible light comprises illuminating the portion of the workpiece that needs additional polishing with the visual light to provide visual feedback to an operator of the polishing operation.

16. The method according to claim 11, further comprising continuing the highlighting of the workpiece during the polishing operation until a desired tolerance between the three-dimensional surface map representation of the current shape of the workpiece and desired shape of the workpiece as embodied by the three-dimensional digital representation of the model is attained.

17. The method according to claim 11, further comprising terminating the highlighting of the workpiece during the polishing operation in response to ascertaining that the desired shape of the workpiece as embodied by the three-dimensional digital representation of the model is attained.

* * * * *